(12) United States Patent
Tsai

(10) Patent No.: US 7,207,484 B2
(45) Date of Patent: Apr. 24, 2007

(54) SYSTEM AND METHOD FOR STOCKTAKING MANAGEMENT

(75) Inventor: Ming Fang Tsai, Tu-chen (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 658 days.

(21) Appl. No.: 10/748,825

(22) Filed: Dec. 29, 2003

(65) Prior Publication Data

US 2004/0153380 A1    Aug. 5, 2004

(30) Foreign Application Priority Data

Dec. 25, 2002   (TW) ............................... 91137235 A

(51) Int. Cl.
*G06F 19/00* (2006.01)
*G06Q 10/00* (2006.01)
(52) U.S. Cl. ......................................... 235/385; 705/28
(58) Field of Classification Search ................ 235/385; 705/22, 28, 29
See application file for complete search history.

(56) References Cited

U.S. PATENT DOCUMENTS

| 6,026,378 | A  | * | 2/2000 | Onozaki | ...................... 705/28 |
| 6,845,909 | B2 | * | 1/2005 | Bong et al. | .................. 235/385 |
| 2003/0216969 | A1 | * | 11/2003 | Bauer et al. | ................... 705/22 |

* cited by examiner

*Primary Examiner*—Michael G. Lee
*Assistant Examiner*—Jamara A. Franklin
(74) *Attorney, Agent, or Firm*—Wei Te Chung

(57) ABSTRACT

A system for stocktaking management includes a server computer (10) and at least one warehouse (40) connected with the server computer via a network (30). Each warehouse includes a plurality of stock locators (44), each stock locator has a single, unique identification number, each warehouse further comprises at least one client computer (42) connected with the server computer for a user to input information on stocks; the server computer is used for storing and processing information on stocks, the server computer comprises at least an input device for inputting information on stocks (16), at least a display device for displaying (18), at least a database (14) for storing information on stocks, and a function module (12) for receiving and processing the information on stocks input by a user. A related method is also disclosed.

6 Claims, 6 Drawing Sheets

SYSTEM AND METHOD FOR STOCKTAKING MANAGEMENT

BACKGROUND OF THE INVENTION

1. Field of the Invention

The present invention relates to systems and methods for inventory management, and particularly to systems and methods for stocktaking management.

2. Description of Related Art

Inventory management plays an important role in ERP (Enterprise Resource Planning). Inventory management has been researched and developed for many years, and stocktaking management is an important part of inventory management.

Most large-scale manufacturing enterprises have a plurality of warehouses, which may be located in a number of countries all over the world. How to manage and coordinate stocktaking of these warehouses is a huge, challenging task. Following the development of computer science and information technology, users can more easily manage stocktaking of both a single warehouse and a group of warehouses.

Japan Pat. No. JP2001088912 published on Apr. 3, 2001 and entitled "Stocktaking Managing Method And Stocktaking System By Image Recognition" discloses a method of stocktaking management of commodities actually displayed on a showcase, and a stocktaking system. The stocktaking system comprises: cameras monitoring commodities on a showcase; camera transfer devices transferring cameras to positions of designated showcases; a camera control device; a camera selection device selecting and inputting camera images; an image extraction device extracting outline data from a selected and image processed input image, and determining and outputting outline characteristic data such as an outline shape; a characteristic data file pre-registering and prerecording characteristic data; a counting device counting a number of each commodity based on the outline characteristic data; and a communication control device connecting and communicating with an in-store communication circuit.

However, the above-described system can only manage the stocktaking of an individual warehouse. The system cannot be used to manage the stocktaking of a group of warehouses. In addition, the cost of the system is high. Moreover, the book value of commodities cannot be updated automatically.

SUMMARY OF THE INVENTION

An object of the present invention is to provide a system for stocktaking management, in which the system can manage stocktaking of a group of warehouses, of selected warehouses, and of selected materials.

Another object of the present invention is to provide a method for stocktaking management, in which the method can manage stocktaking of a group of warehouses, of selected warehouses, and of selected materials.

To achieve the first above-mentioned objective, a preferred embodiment of a system for stocktaking management of the present invention comprises a server computer and a plurality of warehouses electronically connected with the server computer via a network, wherein: each warehouse comprises a plurality of stock locators, each of the stock locators has a unique identification number, each warehouse further comprises at least one client computer connected with the server computer for a user to input information on stocks; the server computer is used for storing and processing information on stocks, the server computer comprises at least one input device, at least one display device, at least one database and a function module, wherein: the input device is used for inputting information on stocks; the display device is used for displaying information on stocks; the database is used for storing information on stocks; and the function module is a serial of logical modules, the function module can display a user interface on the display device, the function module receives and processes the information on stocks input by a user, the function module comprises an information maintaining module, a stock change maintaining module and a stocktaking managing module. The stocktaking managing module comprises a stocktaking result table generating module, a stocktaking value maintaining module, a stocktaking difference adjusting module, and a stocktaking difference analyzing module, wherein: the stocktaking result table generating module generates a stocktaking result table according to the stocktaking results; the stocktaking value maintaining module stores the stocktaking value in the database; the stocktaking difference adjusting module updates the book value according to the stocktaking value; and the stocktaking difference analyzing module generates a difference analyzing table according to a difference between the book value and a stocktaking value.

To achieve the second above-mentioned objective, a preferred method for stocktaking management of the present invention comprises the following steps: (a) providing at least one client computer for a user to input information on stocks; (b) providing a server computer for storing and processing the information on stocks, the server computer comprising at least one input device for a user to input information on stocks, at least one display device for displaying information on stocks, at least one database for storing information on stocks and a function module for receiving and processing the information on stocks input by the user; (c) displaying a user interface on the display device, and receiving and processing the information on stocks input by the user; (d) providing a stocktaking range for the user to select; (e) receiving the stocktaking range selected by the user, and generating a stocktaking result table; (f) receiving a stocktaking value, and storing the stocktaking value in the database; (g) updating a book value according to the stocktaking value; (h) calculating a difference between the stocktaking value and the book value; and (i) generating a difference analyzing table according to the difference between the stocktaking value and the book value.

Other objects, advantages and novel features of the present invention will be drawn from the following detailed description of preferred embodiments of the present invention with the attached drawings, in which:

DETAILED DESCRIPTION OF THE INVENTION

Figure 1:
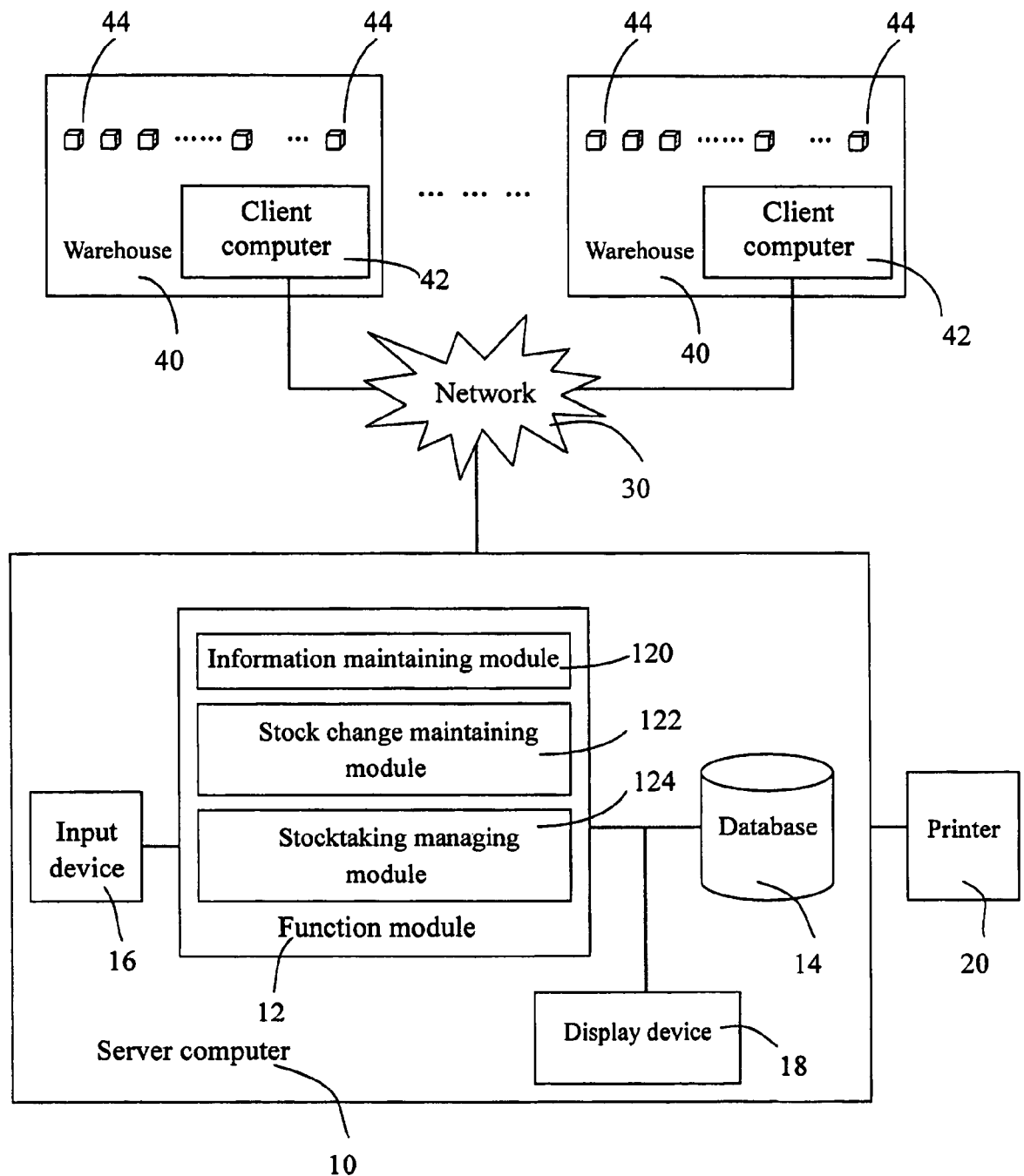
FIG. 1 schematically shows hardware infrastructure of a system for stocktaking management in accordance with the preferred embodiment of the present invention.

Reference will now be made to the drawing figures to describe the present invention in detail.

FIG. 1 schematically shows hardware and software infrastructure of a system for stocktaking management in accordance with the preferred embodiment of the present invention. The system for stocktaking management comprises a server computer 10, a printer 20 connected with the server computer 10, a plurality of warehouses 40, and a network 30 electronically connecting the server computer 10 with the warehouses 40.

The server computer 10 is used for storing and processing information on stocks. The server computer 10 comprises an input device 16, a display device 18, a database 14, and a function module 12. The input device 16 can be a keyboard, a mouse, and so on. A user can input information on stocks via the input device 16. The display device 18 can be a desktop display, a portable LCD (Liquid Crystal Display), and so on. The function module 12 comprises a series of logic modules, which can display a user interface (not shown in the figures) on the display device 18. The database 14 stores information on stocks. The function module 12 can read and process the information stored in the database 14.

Each warehouse 40 has a single, unique identification number, and comprises a plurality of stock locators 44. Each stock locator 44 has a single, unique identification number. Each warehouse 40 further comprises at least one client computer 42. Each client computer 42 is connected with the server computer 10 via the network 30. The client computer 42 is used for inputting information on stocks via the user interface provided by the function module 12. The information on stocks comprises an ID number of each material, a name of the material, a user of the material, a state of the material, the identification number of the warehouse 40, the identification number of the stock locator 44, a quantity of the material, and so on. The state of the material may be raw material, work-in-process product, finished product, or scrap. The input information on stocks is transmitted to the server computer 10 via the network 30.

The function module 12 comprises an information maintaining module 120, a stock change maintaining module 122, and a stocktaking managing module 124. The information maintaining module 120 is used for adding, deleting, and updating the information on stocks. The stock change maintaining module 122 is used for adding, deleting, updating and searching changes of the information on stocks, for storing stocktaking results in the database 14, for updating a book value according to the stocktaking results, and for storing the updated book value in the database 14. The stocktaking managing module 124 reads the information on stocks stored in the database 14, generates a stocktaking result table that can be printed via the printer 20, and adjusts a difference between a stocktaking value and the corresponding book value.

Figure 2:
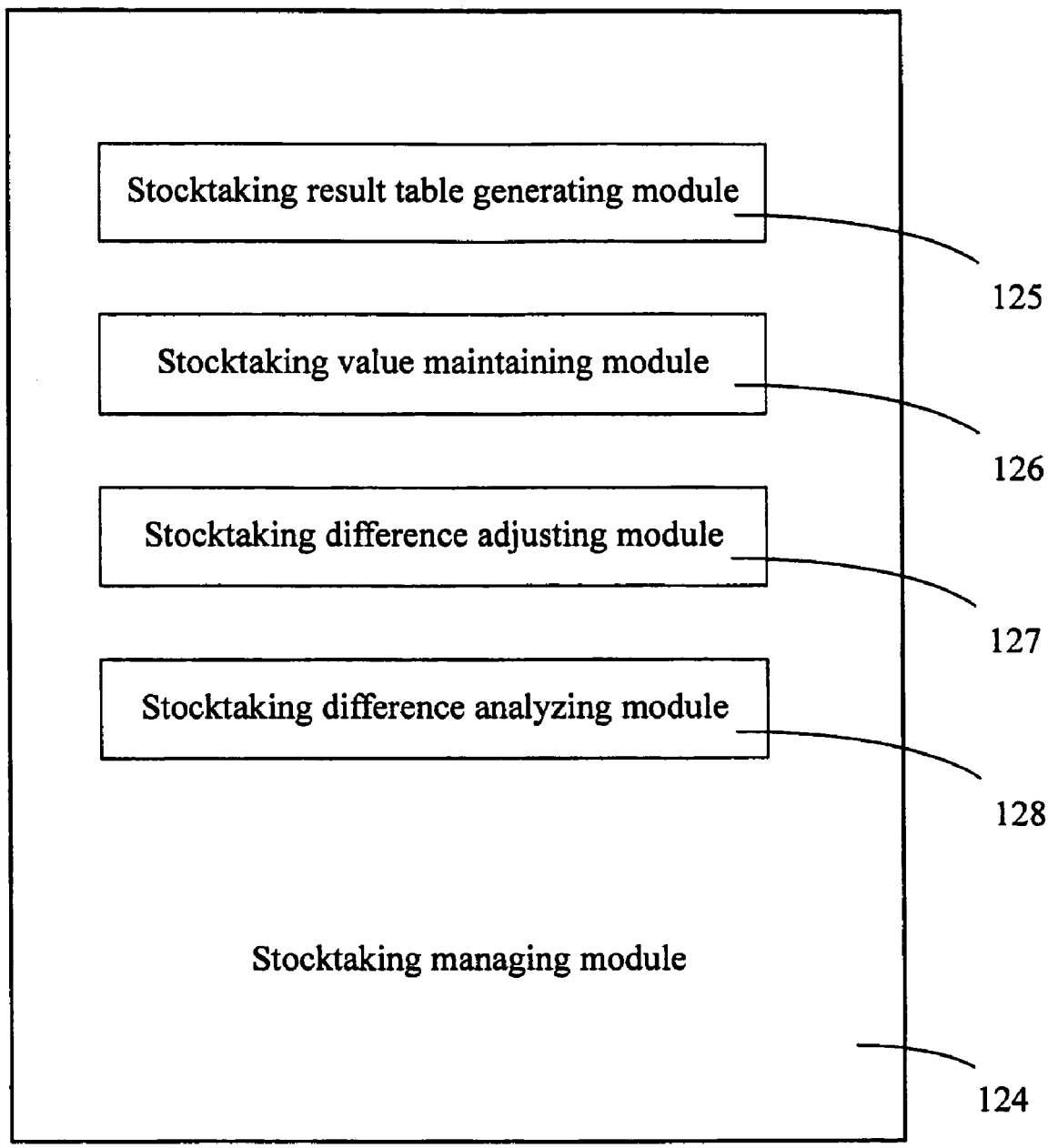
FIG. 2 is a schematic diagram of software infrastructure of the stocktaking managing module.

FIG. 2 is a schematic diagram of software infrastructure of the stocktaking managing module 124. The stocktaking managing module 124 comprises a stocktaking result table generating module 125, a stocktaking value maintaining module 126, a stocktaking difference adjusting module 127, and a stocktaking difference analyzing module 128. The stocktaking result table generating module 125 generates a stocktaking result table according to stocktaking results. The stocktaking value maintaining module 126 stores a stocktaking value in the database 14. The stocktaking difference adjusting module 127 updates a book value according to the stocktaking value. The stocktaking difference analyzing module 128 generates a difference analyzing table according to the difference between the book value and the stocktaking value.

Figure 3:
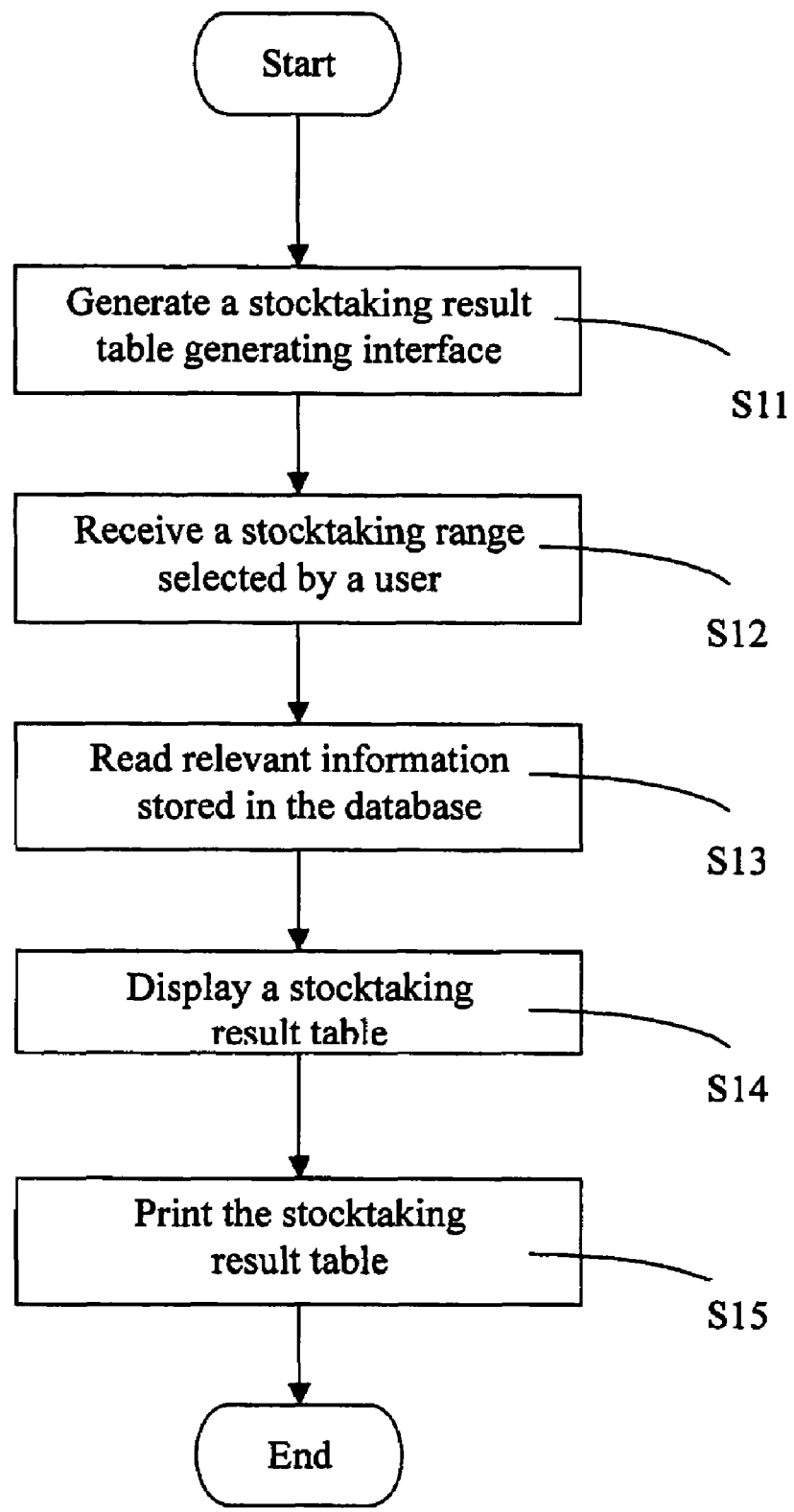
FIG. 3 is a flowchart of a preferred method for generating a stocktaking result table using the stocktaking result table generating module.

FIG. 3 is a flowchart of a preferred method for generating a stocktaking result table using the stocktaking result table generating module 125. In step S11, the stocktaking result table generating module 125 generates a stocktaking result table generating interface. A user can select a stocktaking range via the interface. In step S12, the stocktaking result table generating module 125 receives the stocktaking range selected by the user. In step S13, the stocktaking result table generating module 125 reads relevant information stored in the database 14. In step S14, the stocktaking result table generating module 125 displays a stocktaking result table on the screen of the display device 18. The stocktaking result table comprises an ID number of the material, a name of the material, the identification number of the warehouse 40, the identification number of the stock locator 44, and a book value of the material. The stocktaking result table further comprises a blank field for the user to fill in with a stocktaking value. In step S15, the stocktaking result table generating module 125 transmits a printing order to the printer 20, in order to print the stocktaking result table.

Figure 4:
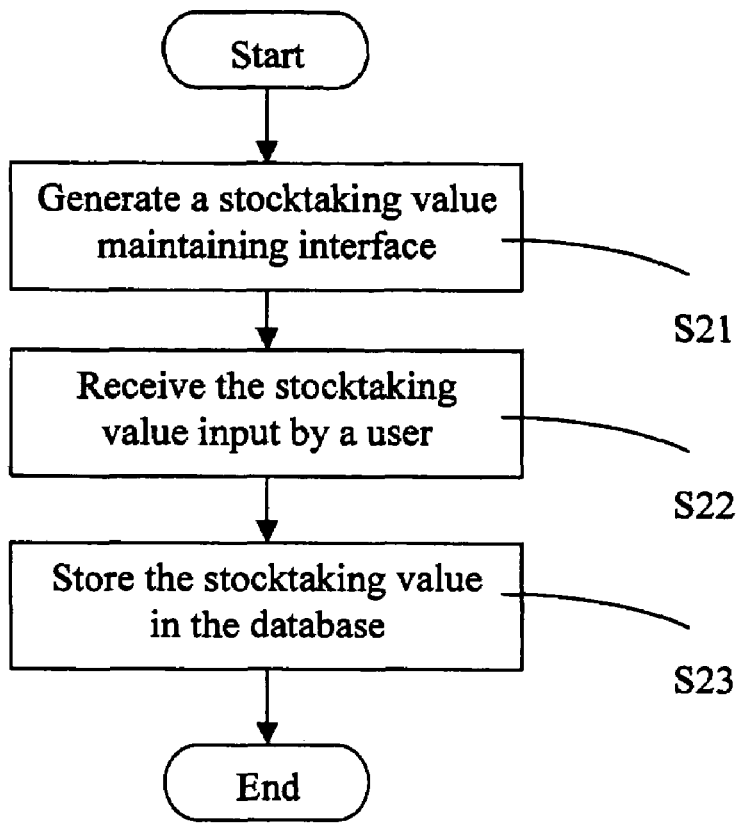
FIG. 4 is a flowchart of a preferred method for stocktaking management using the stocktaking value maintaining module.

FIG. 4 is a flowchart of a preferred method for stocktaking management using the stocktaking value maintaining module 126. In step S21, the stocktaking value maintaining module 126 generates a stocktaking value maintaining interface. A user inputs the stocktaking value via the interface. In step S22, the stocktaking value maintaining module 126 receives the stocktaking value input by the user. In step S23, the stocktaking value maintaining module 126 stores the stocktaking value in the database 14.

Figure 5:
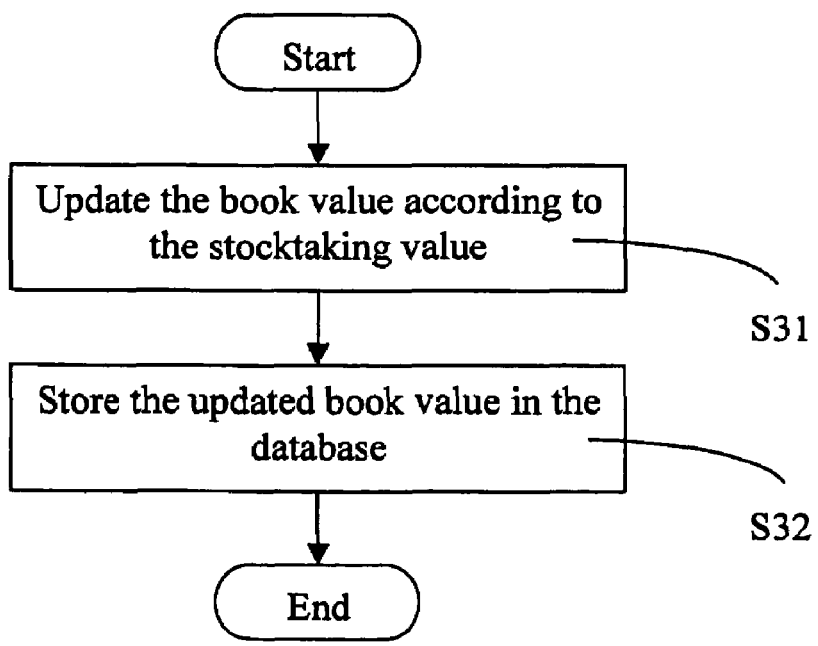
FIG. 5 is a flowchart of a preferred method for stocktaking management using the stocktaking difference adjusting module.

FIG. 5 is a flowchart of a preferred method for stocktaking management using the stocktaking difference adjusting module 127. In step S31, the stocktaking difference adjusting module 127 updates the book value according to the stocktaking value. In step S32, the stocktaking difference adjusting module 127 stores the updated book value in the database 14. The previous book value is also stored in the database 14.

Figure 6:
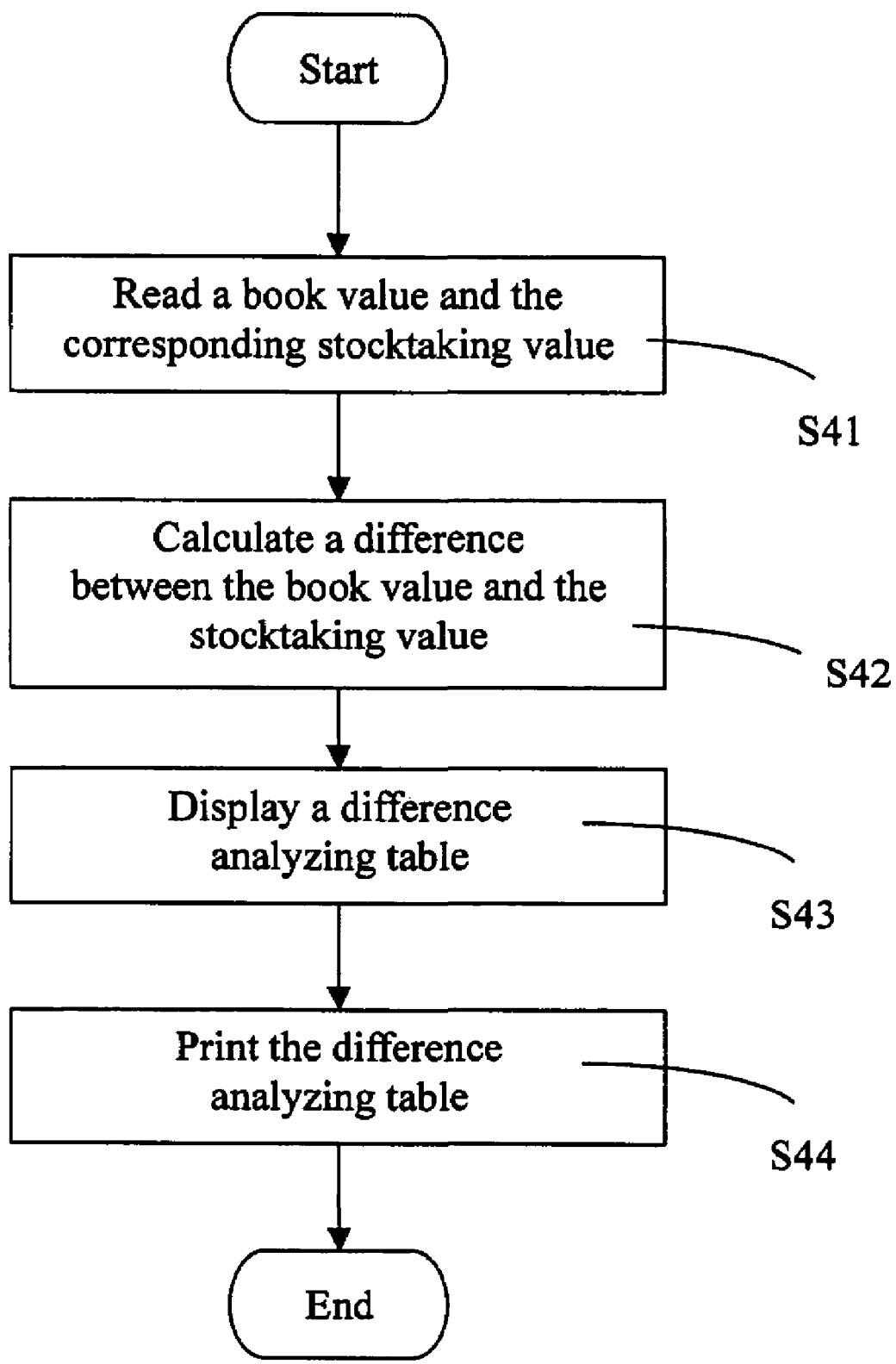
FIG. 6 is a flowchart of a preferred method for stocktaking management using the stocktaking difference analyzing module.

FIG. 6 is a flowchart of a preferred method for stocktaking management using the stocktaking difference analyzing module 128. In step S41, the stocktaking difference analyzing module 128 reads a book value and the corresponding stocktaking value stored in the database 14. In step S42, the stocktaking difference analyzing module 128 calculates a difference between the book value and the stocktaking value. In step S43, the stocktaking difference analyzing module 128 displays a difference analyzing table. The difference analyzing table comprises the ID number of the material, the name of the material, the book value of the material, the stocktaking value of the material, and the difference between the book value and the stocktaking value. In step S44, the stocktaking difference analyzing module 128 transmits a printing order to the printer 20, in order to print the difference analyzing table.

Figure 7:
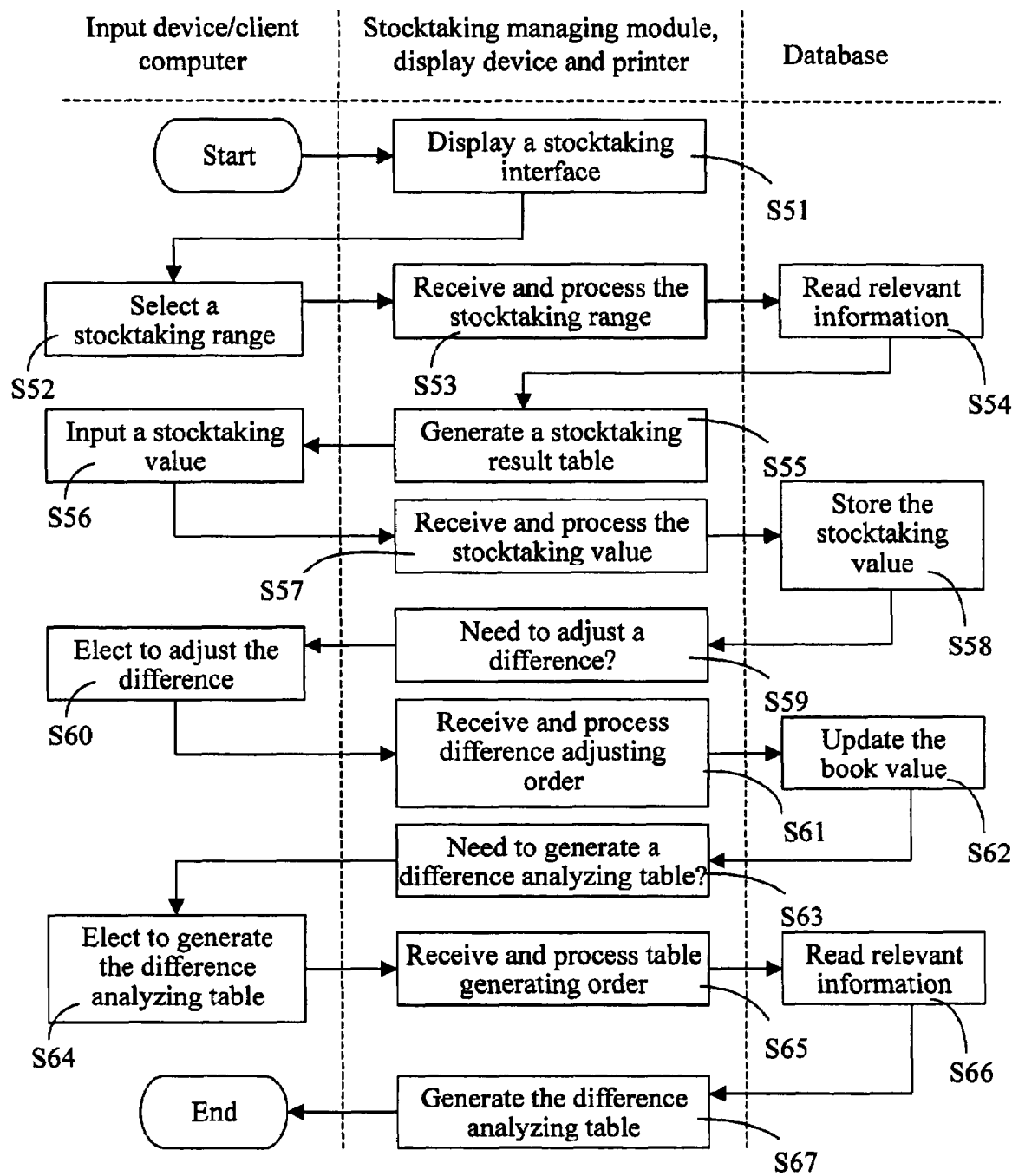
FIG. 7 is a flowchart of a preferred method for stocktaking management.

FIG. 7 is a flowchart of a preferred method for stocktaking management, in accordance with the present invention. In step S51, the stocktaking managing module 124 displays a stocktaking interface on the screen of the display device 18. In step S52, a user selects a stocktaking range via the stocktaking interface. In step S53, the stocktaking managing module 124 receives and processes the stocktaking range selected by the user. In step S54, the stocktaking managing module 124 reads relevant information stored in the database 14. In step S55, the stocktaking managing module 124 generates a stocktaking result table, and displays the stocktaking result table on the screen of the display device 18. In step S56, the user inputs a stocktaking value according to the stocktaking results. In step S57, the stocktaking managing module 124 receives and processes the stocktaking value. In step S58, the stocktaking managing module 124 stores the stocktaking value in the database 14. In step S59, the stocktaking managing module 124 prompts the user as to whether the user needs to adjust a difference between a book value and the stocktaking value. In step S60, the user elects to adjust the difference. In step S61, the stocktaking managing module 124 receives and processes the order to adjust the difference. In step S62, the stocktaking managing module 124 updates the book value according to the stocktaking value, and stores the updated book value and the previous book value in the database 14. In step S63, the stocktaking managing module 124 prompts the user as to whether the user needs to generate a difference analyzing table. In step S64, the user elects to generate the difference analyzing table. In step S65, the stocktaking managing module 124 receives and processes the order to generate the difference analyzing table. In step S66, the stocktaking managing module 124 reads relevant information stored in the database 14. In step S67, the stocktaking managing module 124 generates the difference analyzing table.

In general, the system and method for stocktaking management of the present invention may take forms other than what is described above. While preferred embodiments for carrying out the invention have been described in detail, those familiar with the art to which the invention relates will recognize various alternative designs and embodiments for practicing the invention. These alternative embodiments are within the scope of the present invention. The scope of the present invention is defined by the claims appended hereto and allowable equivalents thereof.

What is claimed is:

1. A system for stocktaking management, the system comprising a server computer and at least one warehouse connected with the server computer via a network, wherein:
   the at least one warehouse comprises a plurality of stock locators, each of the stock locators having a unique identification number, and the at least one warehouse further comprises at least one client computer connected with the server computer for a user to input information on stocks; and
   the server computer is used for storing and processing information on stocks, the server computer comprising at least one input device, at least one display device, at least one database and a function module, wherein:
   the at least one input device is used for inputting information on stocks;
   the at least one display device is used for displaying information on stocks;
   the at least one database is used for storing information on stocks; and
   the function module displays a user interface on the at least one display device for receiving and processing the information on stocks input by a user, the function module comprising an information maintaining module, a stock change maintaining module and a stocktaking managing module.

2. The system for stocktaking management as described in claim 1, wherein the stocktaking managing module comprises a stocktaking result table generating module, a stocktaking value maintaining module, a stocktaking difference adjusting module, and a stocktaking difference analyzing module, wherein:
   the stocktaking result table generating module generates a stocktaking result table according to the stocktaking results;
   the stocktaking value maintaining module stores the stocktaking results in the database;
   the stocktaking difference adjusting module updates a book value according to the stocktaking results; and
   the stocktaking difference analyzing module generates a difference analyzing table according to a difference between the book value and a stocktaking value.

3. A method for stocktaking management, the method comprising the following steps:
   providing at least one client computer for a user to input information on stocks;
   providing a server computer for storing and processing the information on stocks, the server computer comprising at least one input device for a user to input information on stocks, at least one display device for displaying information on stocks, at least one database for storing information on stocks and a function module for receiving and processing the information on stocks input by the user;
   displaying a user interface on the at least one display device, and receiving and processing the information on stocks input by the user;
   providing a stocktaking range for the user to select; and
   receiving the stocktaking range selected by the user, and generating a stocktaking result table.

4. The method for stocktaking management as described in claim 3, further comprising the step of:
   receiving a stocktaking value, and storing the stocktaking value in the database.

5. The method for stocktaking management as described in claim 4, further comprising the step of:
   updating a book value according to the stocktaking value.

6. The method for stocktaking management as described in claim 5, further comprising the step of:
   calculating a difference between the stocktaking value and the book value; and
   generating a difference analyzing table according to the difference between the stocktaking value and the book value.

* * * * *